United States Patent
Both et al.

(10) Patent No.: US 7,405,355 B2
(45) Date of Patent: Jul. 29, 2008

(54) SYSTEM AND METHOD FOR VIDEO ASSISTED MUSIC INSTRUMENT COLLABORATION OVER DISTANCE

(75) Inventors: Christoph Both, Wolfville (CA); James Diamond, Dartmouth (CA)

(73) Assignee: Music Path Inc., Wolfville (CA)

( * ) Notice: Subject to any disclaimer, the term of this patent is extended or adjusted under 35 U.S.C. 154(b) by 456 days.

(21) Appl. No.: 11/009,984

(22) Filed: Dec. 10, 2004

(65) Prior Publication Data
US 2006/0123976 A1 Jun. 15, 2006

(30) Foreign Application Priority Data
Dec. 6, 2004 (CA) .................................. 2489256

(51) Int. Cl.
*G10H 7/00* (2006.01)
(52) U.S. Cl. ...................................................... 84/645
(58) Field of Classification Search .................... 84/645
See application file for complete search history.

(56) References Cited

U.S. PATENT DOCUMENTS

| | | | |
|---|---|---|---|
| 5,183,398 A | 2/1993 | Monte et al. | |
| 6,009,457 A | 12/1999 | Moller | |
| 6,134,243 A | 10/2000 | Jones et al. | |
| 6,175,872 B1 | 1/2001 | Neumann et al. | |
| 6,353,174 B1 | 3/2002 | Schmidt et al. | |
| 6,453,355 B1 | 9/2002 | Jones et al. | |
| 6,653,545 B2 | 11/2003 | Redmann et al. | |
| 6,714,984 B2 | 3/2004 | Jones et al. | |
| 6,717,952 B2 | 4/2004 | Jones et al. | |
| 6,744,763 B1 | 6/2004 | Jones et al. | |
| 6,751,439 B2 | 6/2004 | Tice et al. | |
| 6,803,511 B2 | 10/2004 | Mizuno | |
| 7,129,408 B2* | 10/2006 | Uehara | 84/645 |
| 7,297,858 B2* | 11/2007 | Paepcke | 84/609 |

* cited by examiner

*Primary Examiner*—Jeffrey Donels
(74) *Attorney, Agent, or Firm*—Foley & Lardner LLP (57) ABSTRACT

A novel system and method of video assisted music instrument collaboration over distance. The system and method enable a musician to play a music instrument at one location and have the played music recreated by a music instrument at another location is provided. The system and method can be used to provide distance education for musical instrument instruction and, in this case, each student and instructor of the system has an end point which can connect to other end points in the system to exchange music data, preferably MIDI data, and videoconferencing data through a data network such as the Internet. The system and method can also be used for performances wherein a musician at a first end point plays an instrument and music data, representing the music played, is transferred to a second end point where the music played at the first end point is reproduced and one or more other musicians at the second end point play with the reproduced music in a musical performance. Preferably, each end point includes a music processing engine which buffers data received from another end point to remove the effects of transmission delays and jitter and to discard overly delayed data and to prevent damage to the music instrument at the end point due to undue network delays. Further, the music processing engine can inform the users when network performance is responsible for improper and/or undesired music playback by the instrument at the end point. This buffering by the music processing engine can also allow the synchronization of a video conferencing system between the end points with the playing of music by the instruments at the end points.

15 Claims, 3 Drawing Sheets

SYSTEM AND METHOD FOR VIDEO ASSISTED MUSIC INSTRUMENT COLLABORATION OVER DISTANCE

FIELD OF THE INVENTION

The present invention relates to a system and method for video assisted music instrument collaboration over distance.

BACKGROUND OF THE INVENTION

Music instrument instruction, at all but the most modest levels of music education, requires a great deal of direct collaboration between the student and the instructor. As a student becomes more proficient at their instrument and their art, the level of instructor required to further advance the student also advances. As will be apparent, instructors capable of teaching students at the higher instruction levels are in short supply and under great demand. Conventionally, this has required students at higher levels to move to locations where such high level instructors are available. If the student is not able to move to such a location, access to high-level instructors will not generally be available to them.

Also, collaboration between musicians located at different locations for the purposes of performing has been desired for many years.

The general availability of data communications networks, such as the Internet, has recently led to a great deal of activity in the education space and especially in the area of distance education. Educational instruction of various types is now available over the Internet by way of video (prerecorded or streaming), interactive Java™ applets, class notes, assignments, voice and video conferencing, etc.

While such network-enabled distance education programs have been very well received, to date there has been no system or method to provide the necessary collaboration for real time music instrument instruction, in a distance education environment, or performance.

Specifically, musical instrument instruction requires a very high degree of collaboration between the instructor, the student, the instructor's musical instrument and the student's musical instrument. The collaboration required includes the need for each of the instructor and student to be able to observe each other, speak to each other and hear each other and to be able to interact with each other's instrument in real time. Musical performance requires a similar degree of collaboration between the musicians at each location. To date, no system or method has been available for providing the necessary collaboration through a data network.

Previous attempts have been made at providing collaboration between musicians at different locations through a data network, but these previous attempts have not been directed to the provision of real time music instruction between an instructor and a student or to real time collaboration between performing musicians.

U.S. Pat. No. 6,175,872 to Neumann et al. teaches a system of remote computers which allow musicians at various locations to play together. Instrument data, in the form of MIDI data, is sent via TCP packets from each musician's instrument to each other musician. The packets of MIDI data have a timestamp appended to them from a standard system clock, synchronized across the locations, as well as a predetermined value representing the delay experienced by data traveling across the network. Each location receives the packets, and time orders them according to the clock and delay, after which the MIDI data can be processed by an instrument at the location and the local musician can play his instrument with the instrument playing the received MIDI data.

Despite statements to the contrary in the patent, the system taught by Neumann does not support collaborative performance between musicians as it assumes that the point-to-point delay through the network is constant. In many networks, such as the Internet, jitter (which is the change in the transmission delay experienced by packets moving through the network) is a significant factor which cannot be ignored with time sensitive information such as music data, as very small time-based variations will be perceived by most musicians and/or audience listeners. Further, no provision is made by Neumann et al. to allow other synchronized interaction, such as audio and video conferencing, between the users at each network location. Thus, Neumann et al. does not teach a system or method capable of being used to enable collaboration between musicians for music instrument instruction or performances.

It is also desired to have a system and method which would permit one or more musicians at one location to collaborate and perform with at least one musician at another location.

SUMMARY OF THE INVENTION

It is an object of the present invention to provide a novel system and method for video assisted music instrument collaboration over distance which obviates or mitigates at least one disadvantage of the prior art.

According to a first aspect of the present invention, there is provided a system for enabling a musician at one location to play a music instrument and have the played music recreated by a music instrument at another location, comprising: at least first and second end points, the first end point being connectable to the second end point through a data network, each end point comprising: a music instrument capable of transmitting music data representing music played on the instrument and capable of receiving music data representing music to be played on the instrument; a video conferencing system capable of exchanging video and audio information with the video conferencing system of another end point through the data network; and a music processing engine connected to the data network and to the music instrument and having a user interface, the music processing engine being operable to receive music data from the instrument at the end point and to timestamp the receipt of the music data with a clock synchronized with end points in the system, to transmit the received music data with the timestamp to another end point in the system via the data network, to receive from the data network music data including timestamps from another end point and to buffer the received music data for a selected delay period and in the order indicated by the timestamps in the received music data and to forward the ordered music data, after the selected delay period to the music instrument connected to the end point to play the music represented by the music data.

According to another aspect of the present invention, there is provided a method of enabling a musician at one location to play a music instrument at another location interconnected by a data network, comprising the steps of: (i) connecting a first end point to a second end point through the data network, synchronizing a clock at each end point and establishing a videoconference session between the first and second end points through the data network; (ii) receiving from a music instrument at the first end point data representing music played on an instrument at the first end point; (iii) timestamping the data received from the music instrument with the synchronized clock and transmitting the timestamped music data from the first end point to the second end point through the data network; (iv) receiving the transmitted music data at the second end point and buffering the received music data in timestamped order for a selected delay period; and (v) at the end of the selected delay period, forwarding the timestamp-ordered data to the music instrument at the second end point to accurately recreate on the music instrument at the second end point the music played on the instrument at the first end point.

The present invention provides a novel system and method of enabling a musician to play a music instrument at one location and have the played music recreated by a music instrument at another location. The system and method can be used to provide distance education for musical instrument instruction and, in this case, each student and instructor of the system has an end point which can connect to other end points in the system to exchange music data, preferably MIDI data, and videoconferencing data through a data network such as the Internet. The system and method can also be used for performances wherein a musician at a first end point plays an instrument and music data, representing the music played, is transferred to a second end point where the music played at the first end point is reproduced and one or more other musicians at the second end point play with the reproduced music in a musical performance. Preferably, each end point includes a music processing engine which buffers data received from another end point to remove the effects of transmission delays and jitter and to discard overly delayed data and to prevent damage to the music instrument at the end point due to undue network delays. Further, the music processing engine can inform the users when network performance is responsible for improper and/or undesired music playback by the instrument at the end point. This buffering by the music processing engine can also allow the synchronization of a video conferencing system between the end points with the playing of music by the instruments at the end points.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
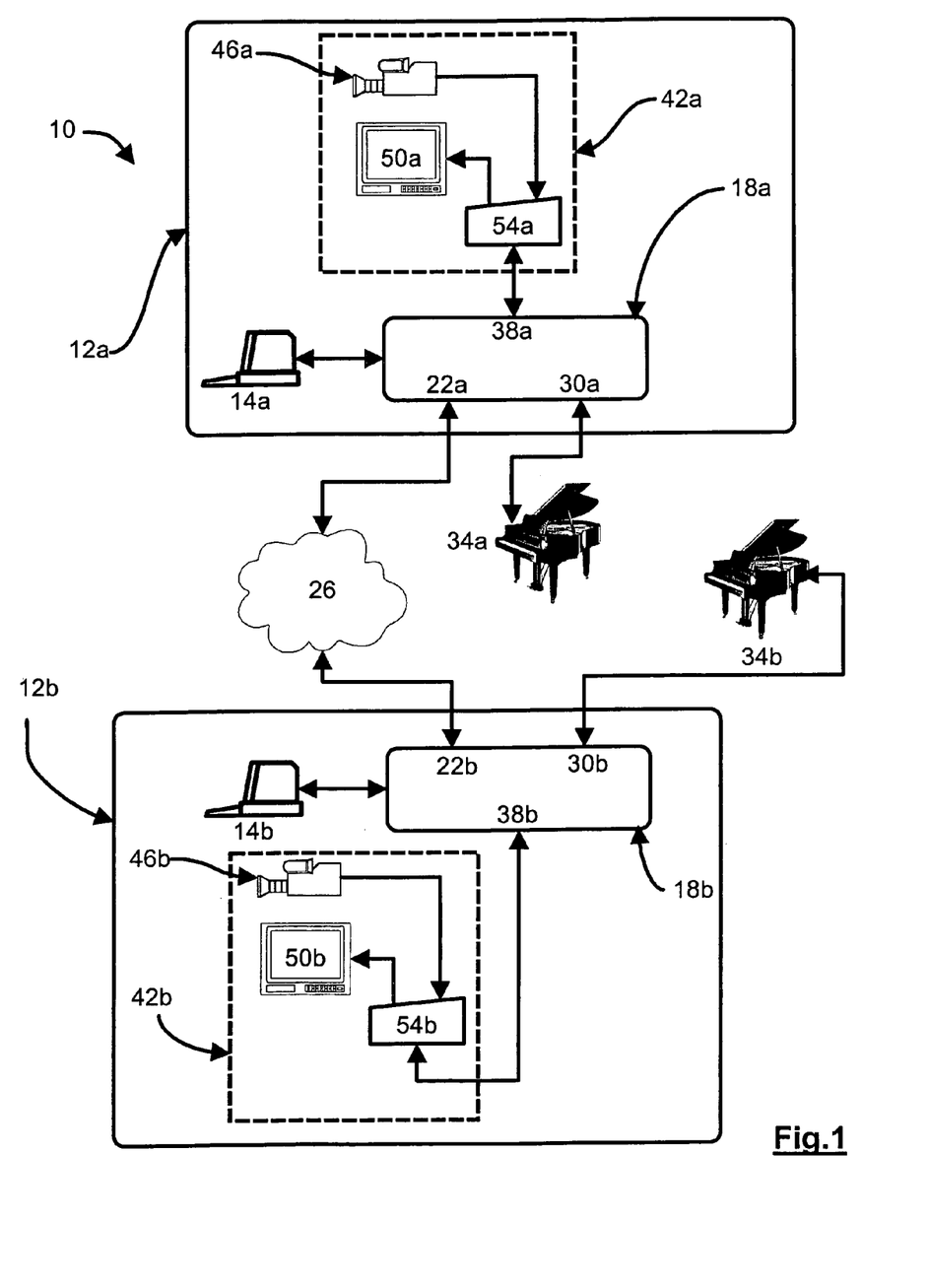
FIG. 1 shows a schematic representation of two end points in a system in accordance with the present invention.

A system for video assisted music instrument collaboration over distance in accordance with the present invention is indicated at 10 in FIG. 1. As illustrated, system 10 includes two user end points 12 and, in the Figure, like components at each user end point 12 are indicated with like reference numerals but with an "a" appended to the reference numbers at the first user end point and a "b" appended to the reference numbers at the second user end point. As will be apparent to those of skill in the art, the present invention is not limited to the connection of two user end points 12 and system 10 can connect multiple user end points 12 if desired, and as discussed below.

In system 10, each user end point 12 includes a user interface 14, a music processing engine 18, an interface 22 to a telecommunications network 26, a MIDI interface 30 to a musical instrument 34 and, optionally, an A/V interface 38 to a video conferencing system 42.

User interface 14 is preferably a suitable user interface program running on a personal computer or other suitable programmable device but can also be any suitable user interface device which can display information relevant to the operation of system 10 to a user and which can receive input from the user to control and/or alter the operation of system 10.

In a present embodiment, music processing engine 18 comprises a personal computer with an Intel Pentium 4 processor, or equivalent, which executes the Linux operating system. In this embodiment, user interface 14 is implemented via a keyboard and display monitor connected to music processing engine 18, which executes a user interface program. The present invention is not limited to music processing engine 18 employing Intel Pentium 4 hardware, nor to music processing engine 18 executing the Linux operating system and any suitable hardware and/or any suitable operating system, including custom purpose built hardware and/or operating system equivalents, can be employed as will be apparent to those of skill in the art.

The music processing engine 18 at each end point 12 need not be identical to the music processing engine 18 at other end points 12 as long as each engine provides the appropriate interfaces, described below, and is capable of executing the client software program required by system 10, as further described below.

In a present embodiment of the invention, network 26 is the Internet and the TCP/IP protocol is employed to transfer data across the network 26. However, the present invention is not limited to network 26 being the Internet and/or the protocol need not be TCP/IP and network 26 can be any suitable network including other packet-based networks, ATM networks, etc. Preferably, network 26 must be capable of sufficient transmission speed to allow the video conferencing system (discussed below) to operate, but such video conferencing systems typically employ video and/or audio compression schemes to reduce their bandwidth needs to reasonable levels. Preferably, network 26 should not be commonly subject to the dropping of data packets, long transmission delays and/or widely varying transmission delays (i.e.—excessive jitter).

In a present embodiment of the invention, instrument 34 is a Yamaha Disklavier Pro which is a MIDI-enabled acoustical-digital grand piano. However, the present invention is not limited to instrument 34 being a Yamaha Disklavier, nor limited to instrument 34 being a piano, and any other suitable MIDI-enabled musical instrument can be employed, such as other keyboards and/or synthesizers or the like. Instrument 34 need not be the same at each end point 12, although this is presently preferred.

MIDI interface 34 can be any suitable interface to connect a personal computer and a musical instrument via the MIDI protocol such as a USB 2.0 interface, an RS-232 serial interface, etc.

In a present embodiment of the invention, video conferencing system 42 is a Polycom iPower 9000 system, sold by Polycom Inc. of Pleasanton, Calif., USA, and includes a video camera 46, a television display 50 and a conferencing processor 54. Video conferencing system 42 can also be the iChat system sold by Apple, Cupertino, Calif., USA or an implementation of gnomemeeting, which is an open source video conferencing system or any other suitable video conferencing system as will occur to those of skill in the art.

Again, video conferencing system 42 need not be the same at each end point 12, as long as the conferencing systems employed are interoperable.

As mentioned above, music processing engine 18 preferably includes an A/V interface 38 to allow communication with and/or control of video conferencing system 42 as discussed below. Depending upon the implementation of video conferencing system 42, A/V interface 38 can be a USB or serial port, a Firewire connection, or a proprietary interface required by the selected video conferencing system 42. However, A/V interface 38 can be omitted, if a standalone video conferencing system is employed at end points 12.

Figure 2:
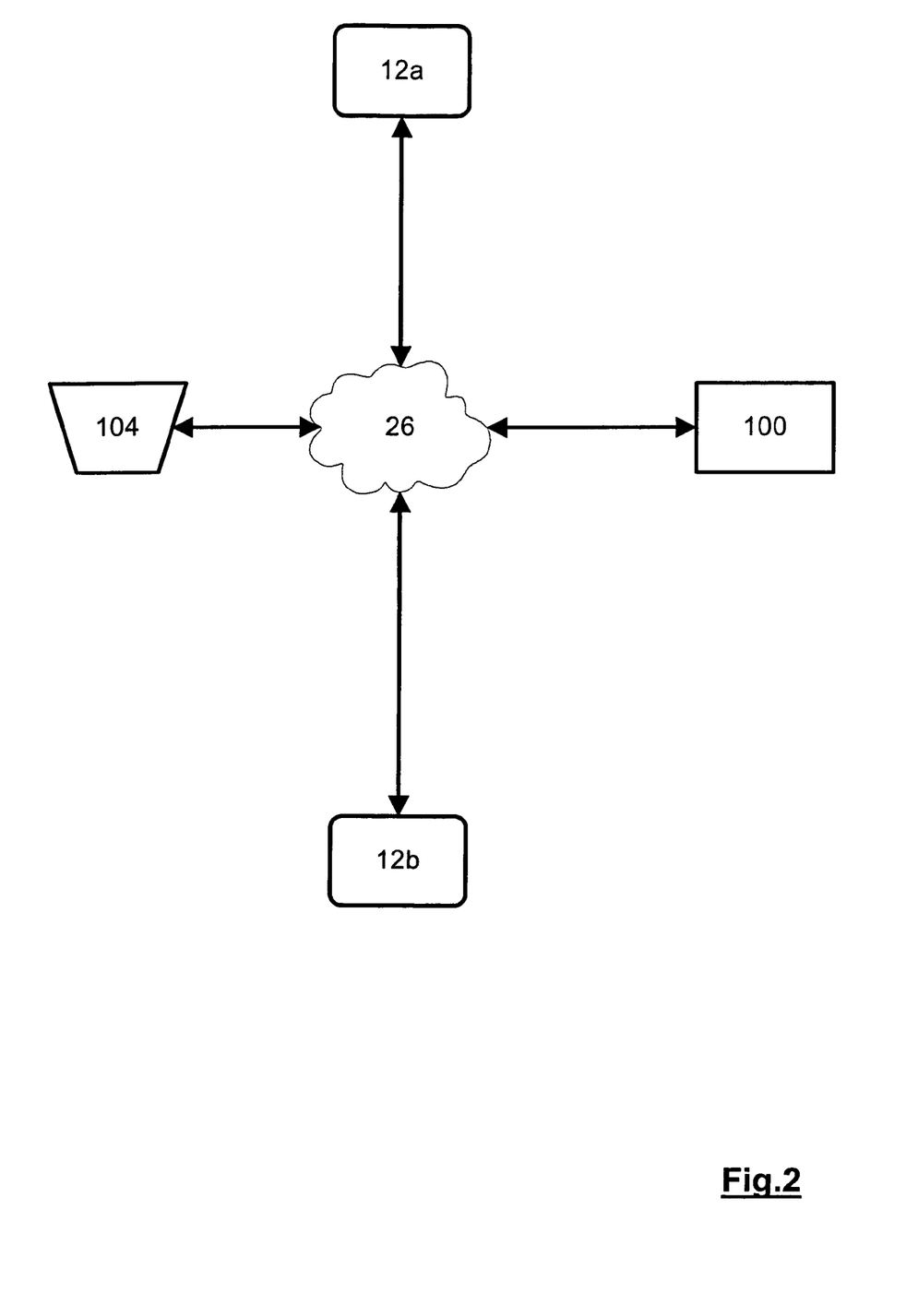
FIG. 2 shows a schematic representation of components and a network of a system in accordance with the present invention.

FIG. 2 shows a network configuration for system 10. A connection server 100 is connected via network 26 to each user end point 12. Connection server 100 is a personal computer with an Intel Pentium 4, or equivalent, executing the Linux operating system and a server program which interoperates with the client software executing at each end point 12 of system 10 to authenticate each user of system 10 and to assist in establishing point to point connections between user end points 12. As will be apparent to those of skill in the art, the present invention is not limited to connection server 100 being implemented on any particular hardware or employing any particular operating systems and other suitable hardware systems and operating systems will be apparent to those of skill in the art.

The client software at each user end point 12 contacts connection server 100, for example by knowing a URL for connection server 100, which then verifies the credentials of that user end point 12 to determine that it is a valid end point 12 to access system 10. If the credentials are verified, then connection server 100 will inform that user end point 12 of the other user end points 12 available and the user at that end point 12 can send a request to connect directly to one or more other user end points 12.

If the user at an end point 12 receiving a connection request accepts the request the connection is established directly between the end points 12 without further involvement of connection server 100.

FIG. 2 also illustrates a network time protocol (NTP) server 104 that is connected to network 26. NTP server 104 is a conventional NTP server which is available to end points 12 to synchronize their clocks so that time-stamping of information sent between end points 12 can be performed, as described below.

Music processing engine 18 executes client software to perform a variety of functions. In a preferred embodiment, music processing engine 18 implements user interface 14 and controls interfaces 22, 30 and 38, if present, and processes music information received from a another end point 12 across network 26 for forwarding to instrument 34 and music information received from instrument 34 to be transmitted across network 26 to another end point 12.

Figure 3:
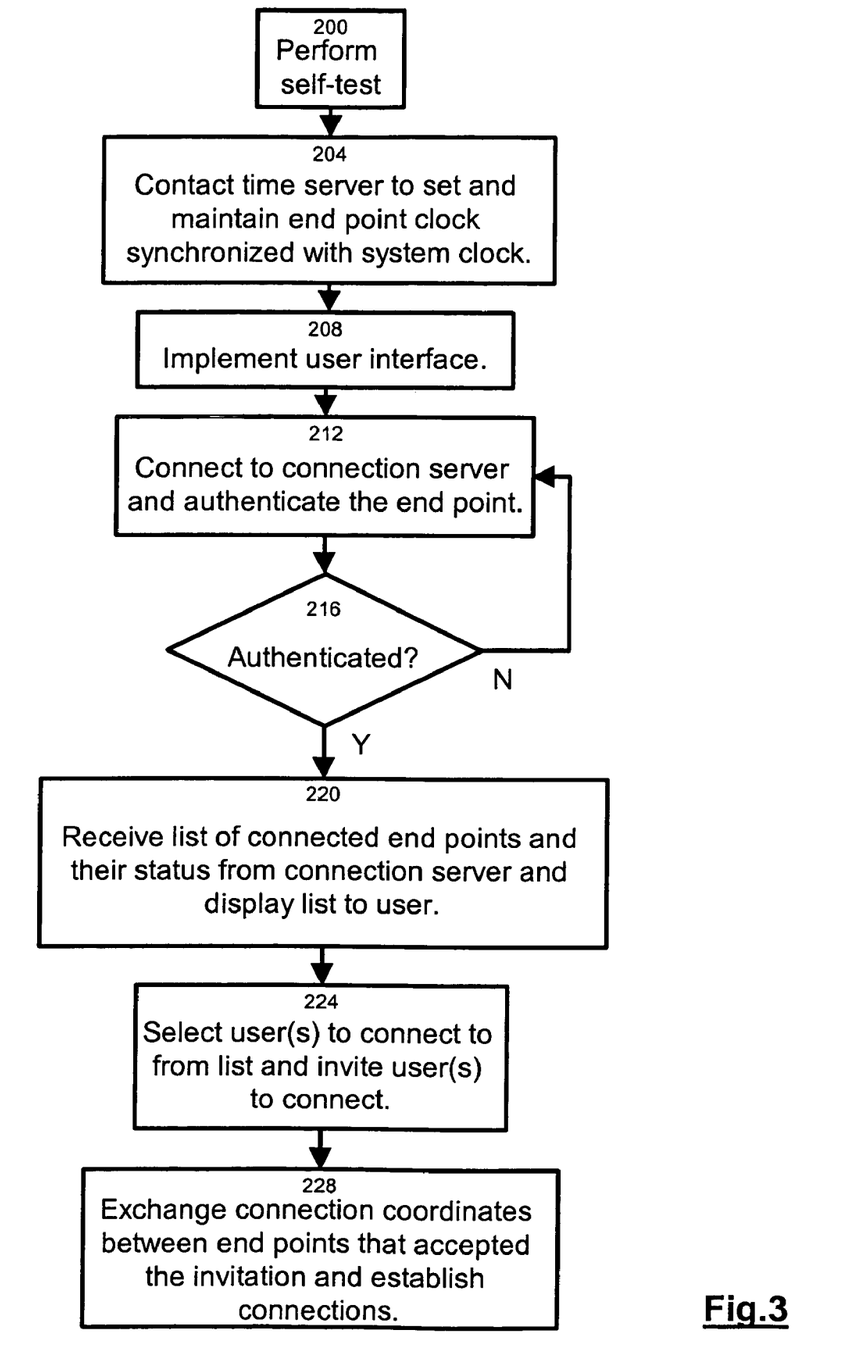
FIG. 3 shows a flowchart of the start up and connection sequence for the system of FIGS. 1 and 2.

FIG. 3 shows the steps involved when a user end point 12 is activated and wishes to connect to one or more other end points 12. At step 200, music processing engine 18 starts and performs a self test. This self test can be a personal computer's power on self test (POST) and/or a test and/or handshaking of the interfaces of music processing engine 18 or can be any other suitable test routine to provide a level of confidence that music processing engine 18 is functioning properly.

Assuming that the self test is passed, at step 204 music processing engine 18 contacts, through network 26, NTP server 104 to set its internal clock. In a present embodiment, all components of system 10 employ UTC time, but any other suitable timebase can be employed as desired. As part of step 204, music processing engine 18 further executes a process, such as the network time protocol daemon (NTPD), to ensure that its internal clock stays synchronized with the clock of NTP server 104.

In a present embodiment of system 10 wherein user interface 14 is implemented in music processing engine 18, at step 208 music processing engine 18 begins to execute the software to provide user interface 14.

Once the internal clock is set, at step 212 music processing engine 18 connects, via network 26, to connection server 100 and provides its credentials to connection server 100. If, at step 216, the end point 12 is not authenticated an appropriate error message can be displayed on user interface 14 and step 212 can be re-attempted.

If, at step 216 end point 12 is authenticated, at step 220 end point 12 receives a list of end points 12 connected to system 10, and their status, from connection server 100 and displays the list to the user of end point 12.

At step 224, the user can select one or more of the listed end points 12 and can forward an invitation to connect to each selected end point 12. As an end point 12 authenticates itself to connection server 100, the fact that the end point 12 is now available to connect to other end points 12 is forwarded by connection server 100 to each other authenticated end point 12. Similarly, when an end point 12 becomes unavailable for connections, as the user has disconnected the end point 12 from network 26, etc., then connection server 100 advises each connected end point 12 of the unavailability of the disconnected end point 12. Preferably each end point 12 will notify connection server 100 of its intent to disconnect from network 26 so that connection server 100 will always have an accurate list of connected end points 12. However, it is also contemplated that connection server 100 can intermittently poll each connected end point 12 to confirm that it is still, in fact, connected. In this manner, end points 12 which are disconnected without first informing connection server 100 (due to improper shut down of an end point and/or a network failure) are detected and connection server 100 can update its list appropriately.

At step 228, for each connection which has accepted the invitation to connect, connection server 100 provides the connection coordinates, such as the relevant IP address, to each end point 12 and the end points 12 create point to point connections between themselves. As part of the establishment of the point-to-point connections, the video conferencing system 42 at each end point 12 is connected to the video conferencing system 42 at each other end point 12.

Preferably, when a connection is established between each two end points 12, music processing engine 18 at the two end points 12 exchange timestamped test data to generate an estimate of the delay and jitter in the network connection between the two end points. These estimates are used by music processing engine 18 to select an appropriate delay time (which will typically be longer than the measured delay plus jitter value to accommodate the time video conferencing system 42 requires to process its data to prepare it for transmission and to process it for use upon reception) for the communication between these two end points 12 and the selected delay time is displayed in user interface 14 at each end point 12. The selected delay is independently adjustable by the user at each end point 12, if desired.

It is also preferred that music processing engine 18 at each end point 12 regularly examine the time stamps of music data it receives (or the video conferencing data if its timing information is available) and compares those timestamps to the synchronized time clock to determine if, and/or how, the delay and/or jitter of the connection between end points 12 through network 26 changes. Music processing engine 18 can alter the selected delay, as necessary, as it detects changes in the delay and jitter of the connection.

Once connections are established between an end point 12 and at least one other end point 12, user operations can begin. Music processing engine 18 begins to process music data received from instrument 34, via interface 30, and music data received from other end points 12 via network 26.

Specifically, if the user at end point 12 plays music on instrument 34, music data representing the music played is transferred to music processing engine 18 via interface 30. Music processing engine 18 timestamps the portions of the received music data representing each note played using the above-mentioned synchronized system clock to mark the time that each note was played and/or each musical event, such as an instrument change (e.g. the application or removal of the "soft" pedal on a piano), occurred.

In a present embodiment of the invention, the music data employed is MIDI data which is a serial stream of music data representing musical notes played and other musical events that have occurred at a sending musical instrument 34. Conventionally, MIDI data is merely forwarded short distances through a wired connection between musical instruments and, at a receiving musical instrument, the notes represented by the data are played as they are received. While it is presently preferred to employ the MIDI data standard for the music data, the present invention is not limited to use with MIDI data and any other suitable protocol or standard for representing music data can be employed.

With the present invention, music data is transmitted over a network 26 which is subject to speed of light transmission speeds, other network delays and jitter. Thus, the accuracy of the timestamping of the music data by music processing engine 18 is very important, as any changes in inter-note timing which might occur due to delay and/or jitter through network 26 would result in the receiving instrument playing, what would effectively be, musical gibberish. Thus, received music data is carefully and very accurately timestamped by music processing engine 18 before transmission through network 26 to another end point 12.

The received and timestamped music data is arranged into payload portions which are then encapsulated into an appropriate structure for transmission through network 26. Music processing engine 18 encapsulates the resulting timestamped music data for transmission across network 26. In the illustrated example, network 26 is the Internet and TCP/IP is used as the transmission protocol, so music processing engine 18 encapsulates the resulting timestamped data into a TCP/IP packet and transmits the packet, via interface 22, to each other end point 12 to which the user's end point is connected via network 26. Music processing engine 18 continues this process as music data is received from instrument 34.

When music processing engine 18 receives a packet of encapsulated music data from a distant user at another end point 12, the music data is extracted from the packets and are reassembled in accordance with the timestamp. Music processing engine 18 arranges the received music data in a buffer for forwarding to the instrument 34. This buffering serves three primary functions: first, to provide sufficient time to ensure that music data has been received and processed before it is due to be forwarded to music instrument 34; second, the music data is stored in the buffer until the correct inter-note timing, as indicated by the timestamp, is reached and the music data can be forwarded to the music instrument 34 for playing to accurately reproduce the music played by the distant user; and third, the buffering allows the video conferencing data to be synchronized with the music data, as discussed below.

As will be apparent, while music instrument 34 reproduces the music played by the distant user, the user at the local end point 12 can also directly play music instrument 34 to, effectively, perform a duet on instrument 34. In such a case, the user at the local end point 12 is effectively achieving a real time musical interaction with the distant user. In fact, as will be apparent, system 10 can thus be used to facilitate real time musical performances where one or more of the musicians are located remotely from the local musician or musicians. As will also be apparent, additional musicians can play in real time on other instruments at a local end point 12 while a distant musician plays through system 10 to the local music instrument 34, whether locally accompanied or not, to achieve a real time performance with a larger number of musicians.

To prevent feedback and/or distractions, preferably when music data is being received from instrument 34 connected to interface 30 at an end point 12, music processing engine 18 can automatically mute the audio output of videoconferencing system 42 via A/V interface 38. Similarly, when music data received from another end point 12, via network 26, is forwarded to instrument 34 for playing, music processing engine 18 preferably automatically mutes the audio output of videoconferencing system 42 via A/V interface 38.

In a presently preferred aspect of the present invention, user interface 14 can be expanded to respond to otherwise conventional controls of music instrument 34. A specific example of this is, when music instrument 34 is a Yamaha Disklavier Pro, the temporary deactivation of the automatic muting, mentioned above, of the audio output of videoconferencing system 42 by a user by pressing and holding down the middle pedal of the Disklavier. As will be apparent to those of skill in the art, the middle pedal of a piano is seldom required during a musical performance and thus this conventional control can be reassigned so that user interface 14 will respond to it as a control input.

When this pedal is pressed, it generates conventional music data indicating that it has been pressed and that music data is forwarded to music processing engine 18. Assuming that this extension to user interface 14 has been activated at music processing engine 18, music processing engine 18 will recognize the conventional music data representing this pressing of the middle pedal as instead being an input from user interface 14, rather than valid music data, and music processing engine 18 will inhibit muting of the audio of video conferencing system 42 just as if a control on user interface 14 had otherwise been activated by the user. In this case, the recognized user interface data is not transmitted to other musical instruments 34 through network 26.

While in this specific example the middle pedal of the Disklavier has been selected, other conventional controls on music instruments 34 can be employed as extended user interface controls as desired and/or as appropriate for other instruments.

As mentioned above, the transmission of music data through a network offers several unique problems. The performance of music is very time sensitive, especially with respect to inter-note timings, and thus delays in the transmission of data through network 26 must be properly dealt with by system 10.

More problematically, data sent through a network 26, such the Internet, experience transmission delays which vary over time and this variation in delay is typically referred to as jitter. If not explicitly dealt with, jitter will usually result in a perceptible degradation in quality of the music, and thus unacceptable quality of music reproduction at an end point 12. Music data subject to jitter will, in most cases, render the played music from such data received at an end point musically compromised and/or even musical gibberish.

Further, music data is time sensitive in that a packet of music data which is received outside a reception time window is effectively lost, as it cannot be played after the required inter-note timing is exceeded, even though TCP/IP and/or other retransmission protocols guarantee eventual delivery of the packet.

Also, in the event of network 26 delaying a group of packets of music data, the sudden arrival of a group of packets of music data and the forwarding of the music data of that group of packets to instrument 34, can result in damage to instrument 34 if it is an electromechanical device, such as the above-mentioned Yamaha Disklavier.

Finally, in the event that system 10 is being used for high level instruction and/or testing of music students, it is desired for the instructor and/or examiners to know if poor results they hear are due to poor performance by the student, or problems with network 26.

Accordingly, music processing engine 18 offers several features to address these concerns. First, music processing engine 18 buffers received music data in a first in, first out (FIFO) buffer before providing the music data to instrument 34. In one embodiment, user interface 14 allows the user to select an appropriate delay for music data extracted from received packets.

By selecting an appropriate delay, which preferably is somewhat larger than the expected transmission time through the network for the greater of the music data or video conferencing system data, plus an expected network delay jitter, the music data is assembled in order in the buffer before forwarding to instrument 34 for playing.

If the selected delay value is sufficient, music data from both packets which arrive relatively quickly and packets which arrive somewhat later can be assembled into the proper order for playing by instrument 34. The assembled music data is then forwarded to instrument 34 in accordance with the timestamp data provided with the music data, where the timestamp is offset by the selected delay.

In addition to correcting for the delay through network 26 and jitter therein, by selecting a delay value, the user of end point 12 can also synchronize the playing of music data by instrument 34 with the video and audio information provided by teleconferencing system 42. Typically, the transmitting end of such teleconferencing systems performs various processing operations, such as video and/or audio compression operations, and the receiving end also performs various processing operations, such as decompressing video and/or audio information and performing error corrections, and such processing operations introduce noticeable delays in the end to end transmission of the video conference across network 26. Further, at least in networks such as the Internet, data for videoconferencing system 42 can experience different transmission delays than the music data through network 26. If not otherwise dealt with, the sum of these delays in videoconferencing system 42 would result in the undesirable non-synchronization of the video conferencing system with the playing of instrument 34.

In one embodiment of the present invention, the user at an end point 12 adjusts the delay for received music data to substantially synchronize the music played by instrument 34 and the video conference signal.

In another embodiment of the present invention, music processing engine 18 is provided with a value indicating the expected processing delay for data sent through video conferencing system 42. This value can be determined empirically or can be estimated. It is also contemplated that in other embodiments video conferencing system 42 can inform music processing engine 18 of its actual processing delay through A/V interface 38. The value indicating the expected processing delay, or the actual processing delay, is then added, by music processing engine 18, to the sum of the transmission delay and jitter values to obtain the selected delay.

As a music instrument protection feature, to avoid providing a large amount of music data from a group of packets which arrived substantially at the same time due to an undue network delay, instrument 34 music processing engine 18 examines the timestamps of received music data and compares those timestamp values to the system clock and the selected delay value for buffering of that data. If the timestamp of any received music data predates the system clock, less the selected buffer value, by more than a predefined amount such as two seconds, such music data is discarded by music processing engine 18 and user interface 14 will indicate that data has been discarded due to network delays. If desired, music processing engine 18 at the receiving end point 12 can also forward a suitable signal to sending end point 12 and the user interface 14 at that end point 12 can provide a suitable signal to advise the performer at that end point of the discarding of the music data by the receiving end point 12.

Similarly, any music data which is received too late to be assembled in the buffer in music processing engine 18 is also discarded and an appropriate indication of this is provided in user interface 14 at the receiving end point 12 and, if desired, at the sending end point 12.

If desired, connected end points 12 in system 10 can also employ a test signal to verify the ongoing acceptable operation of network 26. Specifically, each end point 12 can send packets of "test" data, which can be any suitable data such as music data unplayable (i.e.—of a pitch above the highest pitch of the instrument) by the instrument 34 at the end point or any other agreed data, to each other end point 12 at suitable intervals. Each end point 12 can then operate such that, if one or more packets of such test music data are not received within a selected time about the interval, music processing engine 18 will deem that a transmission error has occurred in network 26. In the even that such a transmission error has been deemed to have occurred, user interface 14 will provide an indication of the transmission error to the user at the receiving end point 12 and, if desired, also at the sending end point 12.

In this manner, appropriate network operation can be confirmed for important transmissions such as music examinations where it is desired to have a high level of confidence that the playing of received music by instrument 34 is an accurate representation of the music played at the source end point 12 and any defects therein are not due to network delays, etc.

When more than two end points 12, e.g.—end points 12*a*, 12*b* and 12*c* (not shown), are connected to each other, at each end point 12 a separate delay is selected for the delay between that end point 12 and each of the other end points 12 as the delay and/or jitter experienced between different end points 12 connected through network 26 can differ.

When music data is received at music processing engine 18*a*, it is time stamped as described above and a copy is sent to each of end points 12*b* and 12*c*. While the transmission time and jitter through network 26 will be different for each of the two copies of this music data, each end point 12*b* and 12*c* applies its respective selected delay to buffer the data received from end point 12*a* and then forwards the timestamp-ordered music data to its respective music instrument 34*b* or 34*c* to be played. End point 12*b* delays this received music data the selected amount of delay appropriate for music originating from end point 12*a*, which might be different than the delay end point 12*b* has assigned to music data received from 12*c*. Similarly, end point 12*a* has a selected delay time for buffering data received from end point 12*b* and a selected delay time for buffering data received from end point 12*c*. End point 12*c* also has selected delays for buffering data received from end point 12*a* and 12*b* respectively.

If end point 12*a* is a music instructor and end point 12*b* is a student, then whenever the instructor at end point 12*a* or the student at end point 12*b* plays, the user at end point 12*c* will also be able to listen in. In this case, the selected delay of the music data at end point 12*c* will be either the selected delay for music data received from end point 12*a* or the selected delay for music data received from end point 12*b*, which selected values can be the same or different.

If it is undesired for an end point 12 to "listen in" in this manner, a control provided on user interface 14 can allow an end point 12 to selectively ignore music data coming from any other end point 12 at any time.

In the embodiments described above, the selected delay of received music at an end point 12 can be manually adjusted by the user at the end point 12 or can dynamically determined by an end point 12. Alternatively, it is contemplated that some videoconferencing systems 42 can provide an output indicating the end to end delay they are experiencing through network 26. In such a case, this output can be provided to music processing engine 18 through A/V interface 38 and music processing engine 18 can select a delay value equivalent to this end to end delay plus any necessary jitter value.

The present invention provides a novel system 10 and method of video assisted music instrument collaboration over distance. When used for music distance education, each student and instructor of the system has an end point 12 which can connect to other end points in system 10 to exchange music instrument data, preferably MIDI data, and videoconferencing data through a data network 26 such as the Internet, essentially in real time. Each end point 12 includes a music processing engine 18 which buffers data received from another end point 12 to remove the effects of transmission delays and jitter and to discard overly delayed data and to prevent damage to the music instrument 34 at the end point 12 due to undue network delays. Further, the music processing engine 18 can inform the users when network performance is responsible for improper and/or undesired music playback by the instrument 34 at the end point 12. This buffering by the music processing engine 18 can also allow the synchronization of a video conferencing system 42 between the end points with the playing of music by the instrument 34 at the end points 12.

In tests of the present invention, the inventors have successfully employed system 10 across a variety of distances such as between end points 12 within a building, between end points across a university campus and between an end point 12 in Nova Scotia Canada and an end point 12 in British Columbia Canada.

The above-described embodiments of the invention are intended to be examples of the present invention and alterations and modifications may be effected thereto, by those of skill in the art, without departing from the scope of the invention which is defined solely by the claims appended hereto.

We claim:

1. A system for enabling a musician at one location to play a music instrument and have the played music recreated by a music instrument at another location, comprising:
    at least first and second end points, the first end point being connectable to the second end point through a data network, each end point comprising:
    a music instrument capable of transmitting music data representing music played on the instrument and capable of receiving music data representing music to be played on the instrument;
    a video conferencing system capable of exchanging video and audio information with the video conferencing system of another end point through the data network; and
    a music processing engine connected to the data network and to the music instrument and having a user interface, the music processing engine being operable to receive music data from the instrument at the end point and to timestamp the receipt of the music data with a clock synchronized with end points in the system, to transmit the received music data with the timestamp to another end point in the system via the data network, to receive from the data network music data including timestamps from another end point and to buffer the received music data for a selected delay period and in the order indicated by the timestamps in the received music data and to forward the ordered music data, after the selected delay period to the music instrument connected to the end point to play the music represented by the music data, wherein the selected delay period is defined by the musician at the end point with the user interface of the music processing engine.

2. The system of claim 1 wherein a musician plays the music instrument at the end point while that music instrument also plays the music represented by the music data.

3. The system of claim 1 wherein, when the music instrument at the end point plays the music represented by the music data, at least one musician plays another music instrument to accompany the music represented by the music data.

4. The system of claim 1 further including a third end point and wherein each end point has a respective selected delay period for communicating with each other end point.

5. The system of claim 1 further comprising a connection sewer which is operable to inform a user at an end point of each other end point connected to the data network.

6. A system for enabling a musician at one location to play a music instrument and have the played music recreated by a music instrument at another location, comprising:
    at least first and second end points, the first end point being connectable to the second end point through a data network, each end point comprising:
    a music instrument capable of transmitting music data representing music played on the instrument and capable of receiving music data representing music to be played on the instrument;
    a video conferencing system capable of exchanging video and audio information with the video conferencing system of another end point through the data network; and
    a music processing engine connected to the data network and to the music instrument and having a user interface, the music processing engine being operable to receive music data from the instrument at the end point and to timestamp the receipt of the music data with a clock synchronized with end points in the system, to transmit the received music data with the timestamp to another end point in the system via the data network, to receive from the data network music data including timestamps from another end point and to buffer the received music data for a selected delay period and in the order indicated by the timestamps in the received music data and to forward the ordered music data, after the selected delay period to the music instrument connected to the end point to play the music represented by the music data, wherein the selected delay period is determined by the end point by exchanging timestamped data with another end point in the system to determine the transmission delay through the network at a given time and adding a selected jitter compensation time to the determined transmission delay time to obtain the selected delay period.

7. The system of claim 6 wherein the selected jitter compensation time is computed by examining the determined transmission delay.

8. The system of claim 6 wherein the data used to determine the transmission delay is music data.

9. The system of claim 6 wherein the selected delay period is re-determined at pre-selected intervals.

10. A system for enabling a musician at one location to play a music instrument and have the played music recreated by a music instrument at another location, comprising:
  at least first and second end points, the first end point being connectable to the second end point through a data network, each end point comprising:
    a music instrument capable of transmitting music data representing music played on the instrument and capable of receiving music data representing music to be played on the instrument;
    a video conferencing system capable of exchanging video and audio information with the video conferencing system of another end point through the data network; and
    a music processing engine connected to the data network and to the music instrument and having a user interface, the music processing engine being operable to receive music data from the instrument at the end point and to timestamp the receipt of the music data with a clock synchronized with end points in the system, to transmit the received music data with the timestamp to another end point in the system via the data network, to receive from the data network music data including timestamps from another end point and to buffer the received music data for a selected delay period and in the order indicated by the timestamps in the received music data and to forward the ordered music data, after the selected delay period to the music instrument connected to the end point to play the music represented by the music data,
  wherein, when the end point receives data from another end point and the music processing engine determines that the transmission delay for the received data exceeds a pre-selected maximum time, the music processing engine discards the received data and provides an indication that it has discarded the data on the user interface.

11. A method of enabling a musician at one location to play a music instrument at another location interconnected by a data network, comprising the steps of:
  (i) connecting a first end point to a second end point through the data network, synchronizing a clock at each end point and establishing a videoconference session between the first and second end points through the data network;
  (ii) receiving from a music instrument at the first end point data representing music played on an instrument at the first end point;
  (iii) timestamping the data received from the music instrument with the synchronized clock and transmitting the timestamped music data from the first end point to the second end point through the data network;
  (iv) receiving the transmitted music data at the second end point and buffering the received music data in timestamped order for a selected delay period; and
  (v) at the end of the selected delay period, forwarding the timestamp-ordered data to the music instrument at the second end point to accurately recreate on the music instrument at the second end point the music played on the instrument at the first end point,
  wherein the selected delay period is selected by a user at the second end point.

12. The method of claim 11 wherein a user at the second end point plays the music instrument at the second end point while the music instrument at the second end point recreates the music played on the music instrument at the first end point.

13. A method of enabling a musician at one location to play a music instrument at another location interconnected by a data network, comprising the steps of:
  (i) connecting a first end point to a second end point through the data network, synchronizing a clock at each end point and establishing a videoconference session between the first and second end points through the data network;
  (ii) receiving from a music instrument at the first end point data representing music played on an instrument at the first end point;
  (iii) timestamping the data received from the music instrument with the synchronized clock and transmitting the timestamped music data from the first end point to the second end point through the data network;
  (iv) receiving the transmitted music data at the second end point and buffering the received music data in timestamped order for a selected delay period; and
  (v) at the end of the selected delay period, forwarding the timestamp-ordered data to the music instrument at the second end point to accurately recreate on the music instrument at the second end point the music played on the instrument at the first end point,
  wherein the selected delay period is determined at the second end point by examining the received data and comparing the timestamps therein to the synchronized clock.

14. A method of enabling a musician at one location to play a music instrument at another location interconnected by a data network, comprising the steps of:
  (i) connecting a first end point to a second end point through the data network, synchronizing a clock at each end point and establishing a videoconference session between the first and second end points through the data network;
  (ii) receiving from a music instrument at the first end point data representing music played on an instrument at the first end point;
  (iii) timestamping the data received from the music instrument with the synchronized clock and transmitting the timestamped music data from the first end point to the second end point through the data network;
  (iv) receiving the transmitted music data at the second end point and buffering the received music data in timestamped order for a selected delay period; and
  (v) at the end of the selected delay period, forwarding the timestamp-ordered data to the music instrument at the second end point to accurately recreate on the music instrument at the second end point the music played on the instrument at the first end point,
  wherein the selected delay period is selected to synchronize the videoconference session information at the second end point with the playing of the received data by the music instrument at the second end point.

15. A method of enabling a musician at one location to play a music instrument at another location interconnected by a data network, comprising the steps of:
  (i) connecting a first end point to a second end point through the data network, synchronizing a clock at each end point and establishing a videoconference session between the first and second end points through the data network;
  (ii) receiving from a music instrument at the first end point data representing music played on an instrument at the first end point;
  (iii) timestamping the data received from the music instrument with the synchronized clock and transmitting the timestamped music data from the first end point to the second end point through the data network;
  (iv) receiving the transmitted music data at the second end point and buffering the received music data in timestamped order for a selected delay period; and
  (v) at the end of the selected delay period, forwarding the timestamp-ordered data to the music instrument at the second end point to accurately recreate on the music instrument at the second end point the music played on the instrument at the first end point,
further comprising the step of discarding data received at the second end point when the timestamp of the received data differs from the synchronized clock by more than a pre-selected difference and providing an indication to the user at the second end point that the data has been discarded.

* * * * *